United States Patent
I'Anson et al.

(10) Patent No.: US 7,050,815 B2
(45) Date of Patent: May 23, 2006

(54) DERIVING LOCATION INFORMATION ABOUT A COMMUNICATING ENTITY

(75) Inventors: Colin I'Anson, Bristol (GB); Rycharde Jeffery Hawkes, Bristol (GB); James Thomas Edward McDonnell, Bristol (GB); Andrew Thomas, Los Altos, CA (US); John Deryk Waters, Bath (GB); Simon Edwin Crouch, Bristol (GB)

(73) Assignee: Hewlett-Packard Company, Fort Collins, CO (US)

( * ) Notice: Subject to any disclaimer, the term of this patent is extended or adjusted under 35 U.S.C. 154(b) by 770 days.

(21) Appl. No.: 09/821,143

(22) Filed: Mar. 29, 2001

(65) Prior Publication Data

US 2001/0041576 A1   Nov. 15, 2001

(30) Foreign Application Priority Data

Apr. 6, 2000   (GB) .................................. 0008364.2

(51) Int. Cl.
*H04Q 7/20* (2006.01)

(52) U.S. Cl. ................................. 455/456.1; 455/456.3; 455/456.6; 455/422.1; 455/457; 455/412.1; 455/414.1

(58) Field of Classification Search ............. 455/456.1, 455/456.2, 456.3, 456.5, 456.6, 457, 403, 455/404.1, 404.2, 412.1, 412.2, 414.1, 414.2, 455/422.1, 426.1, 426.2, 550.1, 552.1, 517, 455/433, 405, 446, 432.1, 435.1, 445
See application file for complete search history.

(56) References Cited

U.S. PATENT DOCUMENTS

| | | | |
|---|---|---|---|
| 5,115,433 A | 5/1992 | Baran et al. | 370/94.3 |
| 5,539,922 A * | 7/1996 | Wang | 455/456.2 |
| 5,675,578 A | 10/1997 | Gruber et al. | 370/248 |

(Continued)

FOREIGN PATENT DOCUMENTS

| | | |
|---|---|---|
| EP | 0 637 152 A1 | 2/1995 |
| WO | WO 99/55114 | 10/1999 |

OTHER PUBLICATIONS

TCP/IP Illustrated, vol. 1, "The Protocols", W. Richard Stevens, 1994, pp. 97–109.

(Continued)

*Primary Examiner*—Keith Ferguson

(57) ABSTRACT

Location information about a communicating entity (41), in particular a mobile entity, is derived by identifying intermediate nodes (42) along the communication path being used by the entity, and then looking up, in a database (44), the geographic significance of at least one of these nodes when considered in a direction along the communication path towards the entity of interest. Preferably, account is taken of any identified downstream/upstream nodes to refine the geographic significance of a node. The geographic significance information can be compiled by taking location fixes at a plurality of endpoint locations and associating the location data thus obtained with the intermediate nodes traversed when communication is effected from the corresponding endpoint locations.

2 Claims, 4 Drawing Sheets

U.S. PATENT DOCUMENTS

| | | | |
|---|---|---|---|
| 5,848,242 A | 12/1998 | Behaghel et al. | |
| 5,956,637 A * | 9/1999 | Ericsson et al. | 455/432.3 |
| 6,016,318 A | 1/2000 | Tomoike | |
| 6,078,575 A * | 6/2000 | Dommety et al. | 370/338 |
| 6,212,392 B1 * | 4/2001 | Fitch et al. | 455/456.2 |
| 6,519,248 B1 * | 2/2003 | Valko | 370/352 |
| 6,757,740 B1 | 6/2004 | Parekh et al. | 709/245 |

OTHER PUBLICATIONS

"Geographic Addressing, Routing, and Resource Discovery With The Global Positioning System" by Imielinski et al., Oct. 19, 1996, 9 pages.

European Search Report dated Apr. 3, 2003, in corresponding to EP 01302204.

Imielinsky et al., "GPS-Based Geographic Addressing, Routing, and Resource Discovery", Communications of the Association for Computing Machinery, Association for Computing Machinery, vol. 42, No. 4, Apr. 4, 1999, pp. 86-92.

Naval et al., "Geocast—Geographic Addressing and Routing", Mobicom, Proceedings of the Annual International Conference on Mobile Computing and Networking, Sep. 27, 1997, pp. 68-76.

* cited by examiner

DERIVING LOCATION INFORMATION ABOUT A COMMUNICATING ENTITY

FIELD OF THE INVENTION

The present invention relates to a method and system for deriving location information about a communicating entity.

BACKGROUND OF THE INVENTION

Communication infrastructures suitable for mobile users (in particular, though not exclusively, Public Land Mobile Networks, PLMN, in the form of cellular radio infrastructures) have now become widely adopted. Whilst the primary driver has been mobile telephony, the desire to implement mobile data-based services over these infrastructures, has led to the rapid development of data-capable bearer services across such infrastructures. This has opened up the possibility of many Internet-based services being available to mobile users.

Data-capable bearer services can be provided, for example, by a Short Message Service (SMS), by using a voice traffic circuit for data, or by using specialised data facilities such as provided by GPRS for GSM PLMNs (GPRS—General Packet Radio Service—enables IP (or X.25) packet data to be sent through the PLMN and full details of GPRS can be found in the ETSI, European Telecommunications Standards Institute, GSM 03.60 specification).

The availability of data-capable services to mobile devices has led to the development of suitable operating environments and applications; of particular note in this connection is the "WAP" (Wireless Application Protocol) standard. Details of WAP can be found, for example, in the book "Official Wireless Application Protocol" Wireless Application Protocol Forum, Ltd published 1999 Wiley Computer Publishing. Where a PLMN is WAP enabled, the data-capable bearer service involved will be routed to the outside world via a WAP proxy gateway.

A number of technologies also exist for the short range wireless communication of information to and between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

The increasingly widespread deployment of the foregoing technologies in mobile devices has led to an increased interest in ways of determining the location of mobile devices, primarily with a view either to providing user-location information to emergency services or to enabling the provision of location-aware information services. A number of methods exist for determining the location of a mobile user as represented by an associated mobile equipment. Some of these methods result in the user knowing their location thereby enabling them to transmit it to a location-aware service they are interested in receiving; other of the methods result in the user's location becoming known to a network entity from where it can be supplied directly to a location-aware service (generally only with the consent of the user concerned). Two known approaches to location determination are described briefly below with reference to FIGS. 1 and 2 of the accompanying drawings, both approaches having in common the fact that the location of the mobile device is derived from a knowledge of the location of fixed infrastructure elements.

FIG. 1 shows how location determination can be effected using local, fixed-position, beacons here shown as infra-red beacons IRD though other technologies, such as short-range radio systems (in particular, "Bluetooth" systems) may equally be used. The right hand half of FIG. 3 show a number of independent beacons 13 that continually transmit their individual locations. Mobile entity 11A is arranged to pick up the transmissions from a beacon when sufficiently close, thereby establishing its position to the accuracy of its range of reception. This location data can then be appended to a request 17 made by the mobile entity 11A to a location-aware service available from service system 40, the request being sent over any suitable communications infrastructure 10 (for example, a PLMN where entity 11A has cellular radio capability, the service system being connected directly to the PLMN or via a network such as the Internet). A variation on this arrangement is for the beacons 13 to transmit information which whilst not directly location data, can be used to look up such data (for example, the data may be the Internet home page URL of a store housing the beacon 13 concerned, this home page giving the store location—or at least identity, thereby enabling look-up of location in a directory service).

In the left-hand half of FIG. 1, the IRB beacons 12 are all connected to a network that connects to a location server 15. The beacons 12 transmit a presence signal and when mobile entity 11B is sufficiently close to a beacon to pick up the presence signal, it responds by sending its identity to the beacon. (Thus, in this embodiment, both the beacons 12 and mobile entity 11B can both receive and transmit IR signals whereas beacons 13 only transmit, and mobile entity 11A only receives, IR signals). Upon a beacon 12 receiving a mobile entity's identity, it sends out a message over network 14 to location server 15, this message linking the identity of the mobile entity 11B to the location of the relevant beacon 12. Now when the mobile entity wishes to invoke a location-aware service provided by the service system 40, since it does not know its location it must include it's identity in the service request 16 and rely on the service system 40 to look up the current location of the mobile entity in the location server 15.

FIG. 2 depicts two general methods of location determination from signals present in a cellular radio infrastructure, PLMN 25. However, first, it can be noted that in general both the mobile entity and the network will know the identity of the cell in which the mobile entity currently resides, this information being provided as part of the normal operation of the system. (Although in a system such as GSM, the network may only store current location to a resolution of a collection of cells known as a "location area", the actual current cell ID will generally be derivable from monitoring the signals exchanged between a Base Station Controller, BSC, and the mobile entity). Beyond current basic cell ID, it is possible to get a more accurate fix by measuring timing and/or directional parameters between the mobile entity and multiple BTSs (Base Transceiver Stations), these measurement being done either in the network or the mobile entity (see, for example, International Application WO 99/04582 that describes various techniques for effecting location determination in the mobile and WO 99/55114 that describes location determination by the mobile network in response to requests made by location-aware applications to a mobile location center—server—of the mobile network).

The left-hand half of FIG. 2 depicts the case of location determination being done in the mobile entity 11C by, for example, making Observed Time Difference (OTD) measurements with respect to signals from BTSs 18 and calculating location using a knowledge of BTS locations. The location data is subsequently appended to a service request 21 sent to service system 40 in respect of a location-aware service. The calculation load on mobile entity 11C can be reduced and the need for the mobile to know BTS locations avoided, by having a network entity do some of the work. The right-hand half of FIG. 2 depicts the case of location determination being done in the network, for example, by making Timing Advance measurements for three BTSs 18 and using these measurements to derive location (this derivation typically being done in a unit associated with BSC 19). The resultant location data is passed to a location server 20 from where it can be made available to authorised services. When the mobile entity 11D of FIG. 2 wishes to invoke a location-aware service available on service system 40, it sends a request 22 to the service system 40; the service system then obtains the current location of the mobile entity 11D from the location server 20.

It has also been proposed to geographically route messages to mobile devices. The paper "Geographic Addressing, Routing and Resource Discovery with GPS" (Tomasz Imielinski and Julio C. Navas; Computer Science Department, Rutgers, The State University Piscataway, N.J.) describes various geographic routing applications including geographic e-mail, geographic broadcasting, and geographically directed multicasting, for example, to all police cars in a specified area. In one described arrangement, "geonodes" provide entry/exit points to a geographic routing system which comprises "georouters" that know which geonodes cover which areas and therefore can make routing decisions for messages that are being geographically routed. The paper also describes a DNS (Domain Name System) solution for geographic routing. The methods described in this paper are not directed at how a mobile entity may obtain its own location.

Also of interest as prior art relevant to the present invention is the "Traceroute" utility for identifying intermediate nodes along a communication path established through an IP (Internet Protocol) network. The operation of this utility is illustrated in FIG. 3 and relies on the fact that a time-to-live field, generally operating as a "hops-remaining" counter, can be set in an IP datagram and when this field is decremented to zero by a receiving node, the latter will return an ICMP message to the source entity, this ICMP message carrying the sending node's IP address as its source address. More particularly, in FIG. 3 a communications path is depicted between a source node 31 and a destination node 32, this path passing through three intermediate nodes 33 (IP routers N1, N2 and N3). In order to identify these intermediate nodes, the source node 31 repeatedly sends a datagram addressed to destination node 32 but with the time-to-live (TTL) field set successively to 1, 2, 3 and 4. The first of these datagrams 34 (TTL=1), on reaching node N1 is not sent on but causes node N1 to return an ICMP "time exceeded" message 35 to the source node 31. The second datagram 36 (TTL initially equal to 2) passes through node N1 without problem but has its TTL field decremented to 1; on reaching node N2, a "time exceeded" ICMP message 37 is returned to source node 31. The third datagram 38 (TTL initially set to 3) passes through nodes N1 and N2 before being stopped at node N3 which returns a "time exceeded" ICMP message 39 to source node 31. Finally, the source node 31 sends a datagram 30 with TTL=4 and this reaches destination node 32.

It is an object of the present invention to provide location information about a communicating entity that can take advantage of communication infrastructure elements that are not of themselves location aware.

SUMMARY OF THE INVENTION

According to one aspect of the present invention, there is provided a method of deriving location information about a first entity forming one endpoint of an actual or potential communication path at the other end of which is a second entity, said method comprising the steps of:
(a) identifying one or more intermediate nodes along said path;
(b) accessing information about the geographic significance of at least one said intermediate node when considered in a direction along said path towards said first entity; and
(c) using the geographic significance information accessed in step (b) to provide said location information about the first entity.

According to another aspect of the present invention, there is provided a method of discovering geographic significance information about nodes in a communications infrastructure, comprising the steps of:
(a) deriving location data about a first entity forming one endpoint of an actual or potential path through the communications infrastructure to a second endpoint entity;
(b) identifying one or more intermediate nodes along said path;
(c) associating the location data with the or each said intermediate node;
(d) repeating steps (a) to (c) multiple times for different first-entity locations and thereafter consolidating for each node, the associated location data into location zone data constituting said geographic significance data for the node.

According to a further aspect of the present invention, there is provided a system for deriving location information about a first entity forming one endpoint of an actual or potential communication path at the other end of which is said system, the path extending at least in part through a fixed communications infrastructure, the system comprising:
a data store holding information about the geographic significance of internal nodes of the fixed communications infrastructure, with respect to directions of traversal of the nodes;
a node-discovery subsystem for identifying one or more said nodes that lie along said path intermediate the system and the first entity; and
a data-processing subsystem operative to look up, in the data store, geographic significance information regarding at least one said intermediate node identified by the node discovery subsystem, the geographic significance information concerned relating to a direction of traversal of the node in a direction along said path towards said first entity and this information being used by the data-processing to provide said location information about the first entity.

BRIEF DESCRIPTION OF THE DRAWINGS

A method and system, both embodying the present invention, for deriving location information about a communicating entity, will now be described, by way of non-limiting example, with reference to the accompanying diagrammatic drawings, in which.

BEST MODE OF CARRYING OUT THE INVENTION

Figure 4:
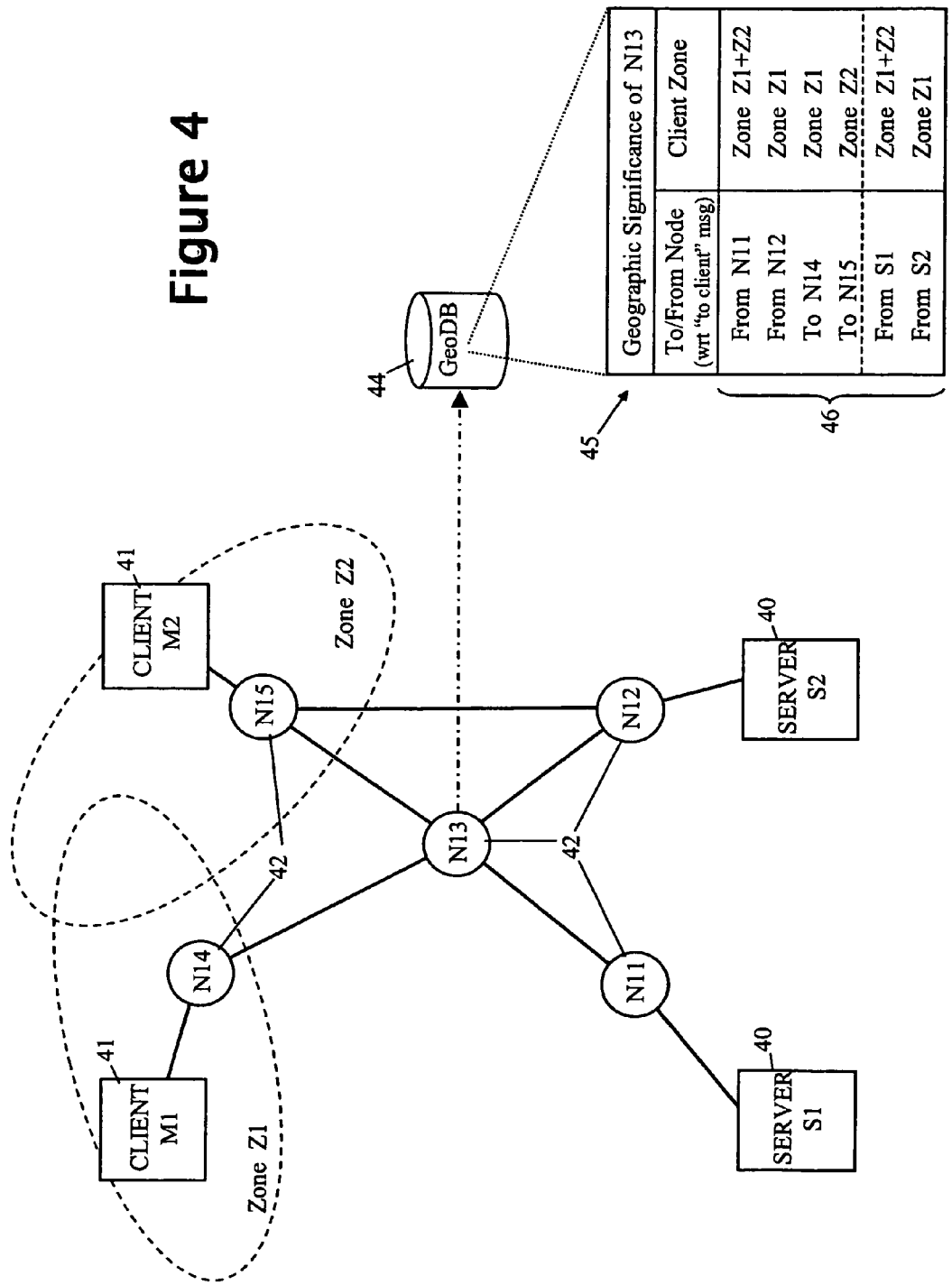
FIG. 4 is a diagram illustrating the method embodying the invention whereby information of geographic significance is associated with intermediate nodes along a communication path and accessed to ascertain location information about an entity of interest.

FIG. 4 shows linkages in a communications infrastructure relevant to communication between two clients 41 (individually referenced M1 and M2) and two servers 40 (individually referenced S1 and S2). The communications infrastructure comprises nodes 42 (individually referenced N11 to N15). The clients 41 are, for example, mobile entities and the servers 40 service systems; in this case, the nodes N14 and N15 are, for example, WAP proxy gateways and the nodes N11, N12 and N13 are IP routers on a network (such as the internet) connecting the gateways to the service systems. Whether or not the clients are mobile entities, in the FIG. 4 example the nodes N14 and N15 are taken as providing communication connectivity only for clients within respective coverage zones Z1 and Z2 respectively. The communications infrastructure can be made up of one or more networks of one or more types, including IP networks, telephone networks, etc.

The communication paths through the infrastructure between the servers 40 and clients 41 extend through the following nodes (assuming non-congested routing by the intermediate nodes):

S1 to M1 S1–N11–N13–N15–M1
S1 to M2 S1–N11–N13–N14–M2
S2 to M1 S2–N12–N13–N15–M1
S2 to M2 S2–N12–N14–M2

The present invention is concerned with ascertaining location information about an entity (such as the client M1 or M2) that forms one endpoint of a communication path through the infrastructure. In particular, the method of the invention uses the geographic significance of infrastructure nodes on the communication path to derive location information. Of course, since every node in the communication infrastructure is directly or indirectly linked to every other node, the mere fact that a communication path passes through a node does not, of itself, give any clue as to the location of an endpoint entity. However, when direction of node entry and/or exit is taken into account, useful information about the locality of the endpoint entity of interest can be derived. (for convenience, node entry and exit directions are considered herein relative to a direction along the communication path towards the endpoint entity of interest, it being appreciated that the opposite direction could equally have been used as the reference direction). Examination of FIG. 4 shows, for example, that where a communication path, considered in a direction towards the entity of interest, enters node N14 from node N13, then the entity of interest will lie in zone Z1. Similarly, where a communication path exits node N12 towards node N13, the implication is that the entity of interest also lies in zone Z1 (because if the entity of interest lay in zone 2, the communication path exiting N12 would have been directed towards N15). It will be appreciated that exiting a first given node towards a second given node conveys the same location information as the entering of the second given node from the first.

For each node 42 it is therefore possible to build up an association between entry and exit direction (as defined, for example, by the adjacent node) and the geographic significance of the node. According to the present method, this association is stored as a corresponding node record 45 in a database ("GeoDB") 44. In FIG. 4, the record 45 for node N13 is depicted. As can be seen, where node N13 is entered from node N12, the endpoint entity of interest (a client 41) can be said to lie in zone Z1 whereas where the node N13 is entered from node 11, the client 41 can only be said to reside in the locality defined by the sum of zones Z1 and Z2. Where node N13 is exited towards node N14, client 41 can be said to lie in zone Z1 whereas if node N13 is exited towards node N15, then client 41 lies in zone Z2. Generally, the node exit direction will give more precise geographic significance information than the node entry direction (since, of course, the latter corresponds to the exit direction information of the upstream node, and the geographic significance information will generally be more pertinent the nearer along the communication path one is to the client of interest). Whilst storing geographic significance information for both entry and exit directions of a node would appear unnecessary, this assumes that all nodes have a corresponding record 46; if for example, there was no record 45 for node N15, then having the geographic significance information for the exit directions of nodes N13 and N12 permits the significance of node N15 being on the communication path still to be available.

Figure 1:
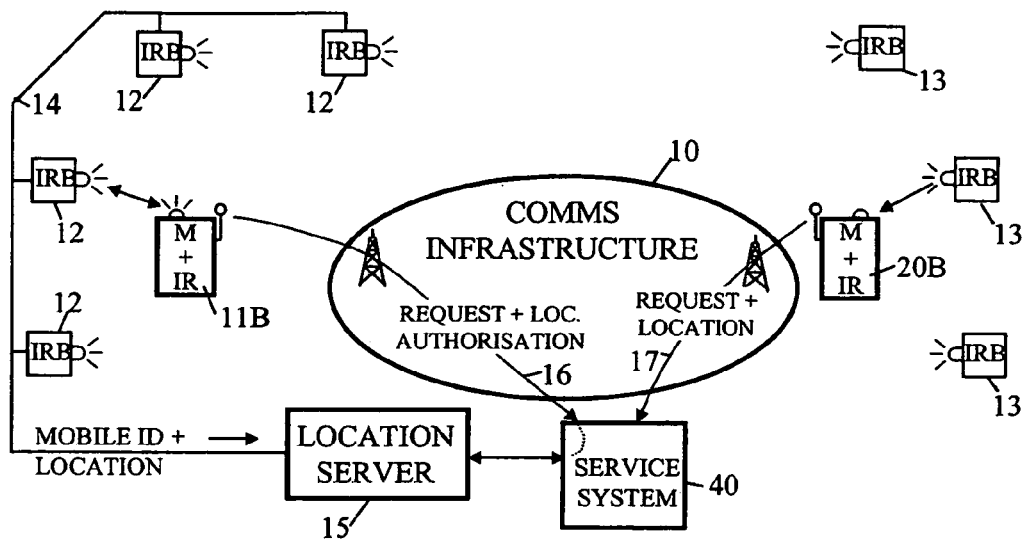
FIG. 1 is a diagram illustrating one known approach to determining the location of a mobile entity, this approach involving the use of local location beacons.
Figure 2:
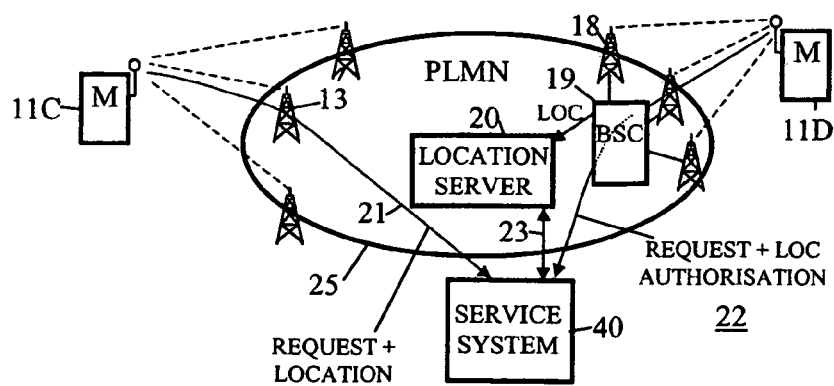
FIG. 2 is a diagram illustrating another known approach to determining the location of a mobile entity, this approach being based on the use of signals present in a cellular mobile radio communications system.
Figure 3:
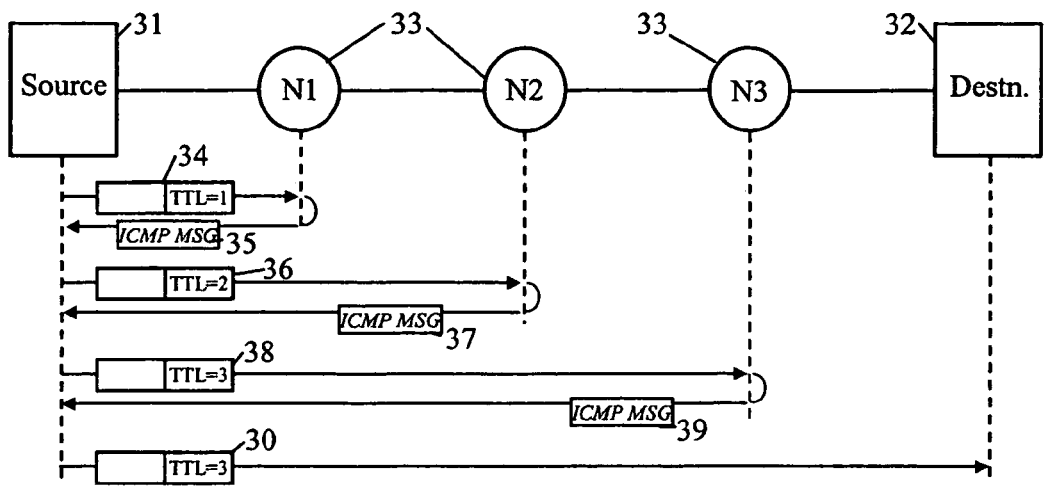
FIG. 3 is a diagram illustrating a known "traceroute" utility for identifying intermediate nodes along a communications path.

Of course, the usefulness of the geographic significance records of the nodes 42 depends on a knowledge of the nodes on the communication path towards the client of interest. A method has already been described with respect to FIG. 3 as to how the intermediate nodes along a path through an IP network may be discovered using the "Traceroute" utility. Similar methods exist for other network types. Furthermore, the communication infrastructure may include networks that can only be accessed by directly contacting, at least initially, a gateway node for the purpose, for example, of carrying out an access authorisation procedure and setting up a tunnel through the gateway; in such cases, the identity of the gateway will be explicitly known to at least one endpoint entity.

However, since it may not be possible to discover all nodes along a communication path, it is useful to include in each node record 45 entries for known service systems such as servers S1 and S2 so that where such a service system forms one of the endpoints of the communication path, there will always be a default "from" entity. Thus for a communication path from server S2 to client M1, if the node N12 is not discovered, the geographic significance of node N13 being on the path can still be ascertained from the record 45 for node N13.

Figure 5:
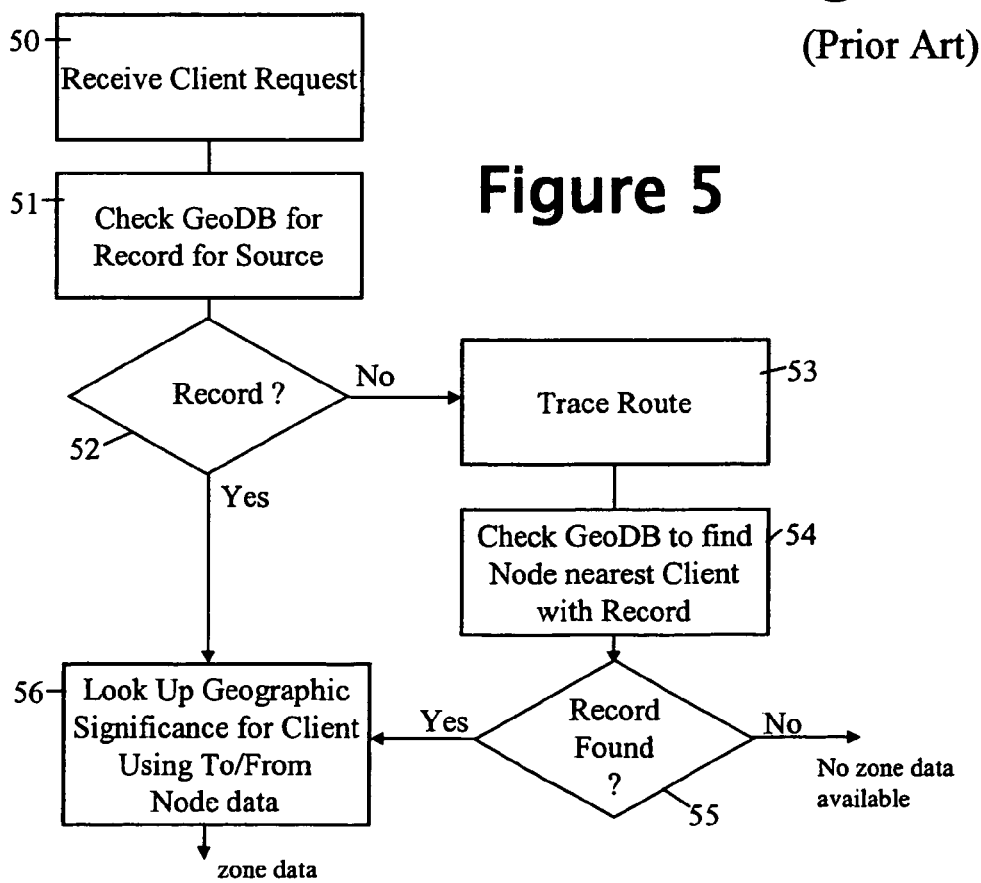
FIG. 5 is a diagram showing the main steps carried out in the course of effecting the method of FIG. 4.

The main steps in the operation of the method embodying the invention are depicted in FIG. 5 for a scenario where a service system 40 receives a request for a location-aware service from a mobile client 41 and the service system is given the responsibility of deriving location information about the client 41. More particularly, upon receiving the client request (step 50), the service system 40 first checks (step 51) to see whether the source of the message has an entry in the GeoDB 44—this could be the case where the message is being forwarded by a proxy node that has a corresponding record 45. If such a record exists (checked in step 52) then since the corresponding entity is likely to be the closest discoverable node to the mobile client, the service system 40 proceeds immediately to look up the geographic significance of that node in respect of entry from the service system (step 56).

If the source of the client request does not have an entry in GeoDB 44, then the service system seeks to discover the intermediate nodes lying along the communication path between itself and the requesting client (step 53). Since the most accurate geographic significance data will be associated with the node closest to the client, once the intermediate nodes have been identified, the service system next works down the list of nodes, starting from the node nearest the client, until it finds anode for which there exists a record in GeoDB 44 (see step 54) and then carries up step 56 for that node. If, however, no such node is identified, (checked in step 55), the service system terminates the location information discovery method.

Where the service system found location information on the client, it can either directly use the information for input to the requested location aware service or use it to access a more precise location determination method (for example, once the general area of a client is known, a local location discovery method can be activated or a relevant location server interrogated).

It will be appreciated that whilst in the foregoing example, it was the service system that carried out the method steps of FIG. 5, the client 41 could alternatively have carried out the steps. Furthermore, whilst FIGS. 4 and 5 have been described in terms of ascertaining location information about clients 41, the same approach could be employed for localizing the service systems 40 or, indeed, any other communication endpoint.

Figure 6:
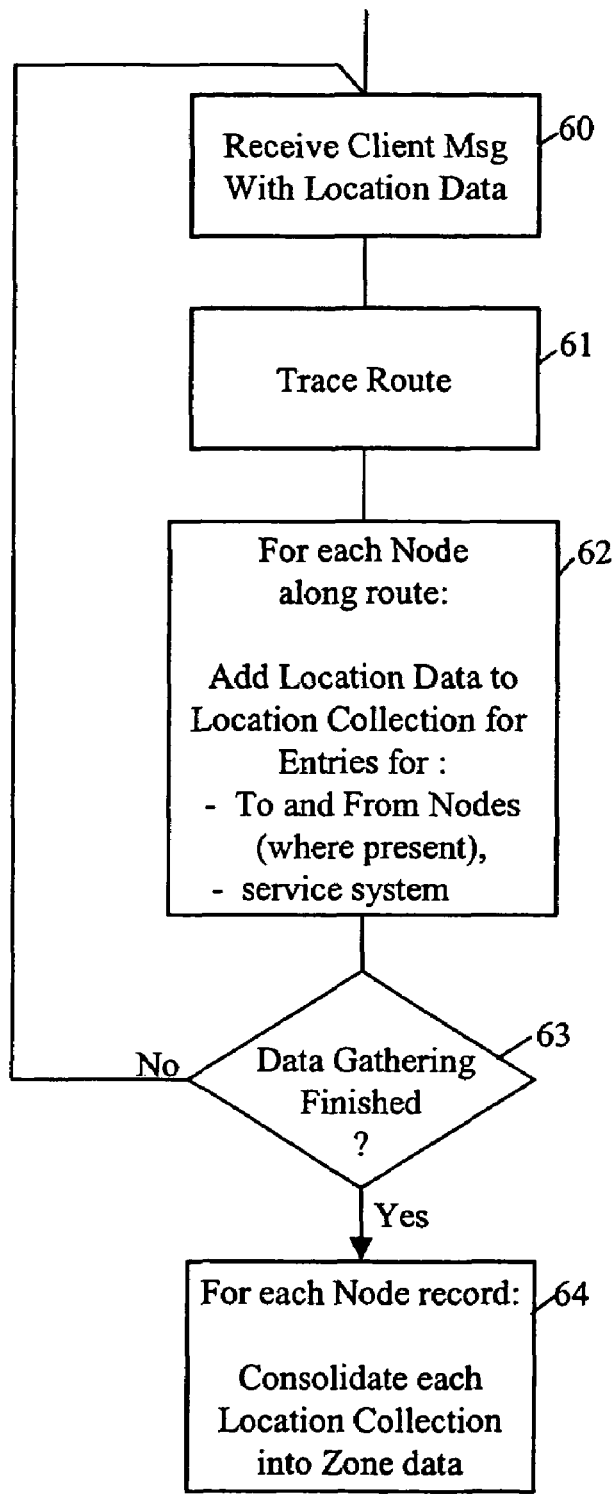
FIG. 6 is a diagram showing the main steps of one method of compiling the geographic significance information used in the method of FIG. 4.

With respect to how the data for the GeoDB is collected, it could largely be derived by studying the routing tables of the nodes 42. However, an empirical method is likely to be more practical and the steps involved in one such method are illustrated in FIG. 6. More particularly, a mobile client equipped with location discovery means, such as a GPS receiver or a local location-data beacon receiver, is moved around the geographic area of interest. At selected locations, the client discovers its location and sends the location data back to a service system 40 (step 60). The service system then identifies the intermediate nodes (step 61) on the communication path between itself and the mobile client. Next, for the geographic-significance record 45 of the each identified node, the service system adds the received location data to a respective location collection associated with each record entry relating to a node entry/exit direction lying along the communication path between the service system and mobile client (step 62).

Steps 60, 61 and 62 are then repeated for a plurality of different locations until data gathering is complete (checked for in step 63).

Thereafter, the service system consolidates (step 64) the location data in each collection to form a zone description encompassing all indicated locations, this being the zone data Z1 and Z2 of FIG. 4 stored in the records 45.

This process is carried out for the or each service system of interest (in fact, it is not necessary to target any particular service system from the point of view that some relevant geographic significance information is likely to be derived wherever the non-client endpoint is—however, unless the non-client endpoint is close to the real service systems of interest, nodes close to these systems may not be involved in the data gathering phase).

As will be appreciated by persons skilled in the art, many variants are possible to the above-described embodiment. For example, since the execution of utilities such as the "Traceroute" program for discovering intermediate nodes between two endpoints only requires that the address of the far endpoint be known and does not, in fact, require the establishment of communication between the endpoints, the method of FIG. 4 can be used to discover location information about an endpoint of a potential communication path and not just an actual communication path provided an address is known for the endpoint.

Furthermore, whilst the FIG. 4 method has been described generally in relation to data paths through the communications infrastructure, it will be appreciated that where signaling-data paths are distinct from load-data paths (as in a telephone network for example), then the described method can be applied equally to the load-data and signaling-data paths.

The invention claimed is:

1. A method of discovering geographic significance information about nodes in a communications infrastructure, comprising the steps of:

(a) deriving location data about a first entity forming one endpoint of an actual or potential path through the communications infrastructure to a second endpoint entity;

(b) identifying one or more intermediate nodes along said path;

(c) associating the location data with each said intermediate node; and (d) repeating steps (a) to (c) multiple times for different first-entity locations and thereafter consolidating for each node, the associated location data into location zone data constituting said geographic significance data for the node.

2. A method according to claim 1, wherein step (c) involves for each node with which location data is associated, noting the identity of any upstream/downstream node along said path towards the first entity; step (d) providing the location zone data for the node for access according to upstream/downstream node.

* * * * *